(12) United States Patent
Vilone et al.

(10) Patent No.: US 10,334,902 B2
(45) Date of Patent: Jul. 2, 2019

(54) ATTACHMENT SYSTEM

(71) Applicant: Revision Military S.a.r.L., Luxembourg (LU)

(72) Inventors: Mario Vilone, Montreal (CA); Nicolas Desjardins, Pincourt (CA)

(73) Assignee: Revision Military S.a.r.L., Luxembourg (LU)

( * ) Notice: Subject to any disclaimer, the term of this patent is extended or adjusted under 35 U.S.C. 154(b) by 166 days.

(21) Appl. No.: 15/644,169

(22) Filed: Jul. 7, 2017

(65) Prior Publication Data
US 2019/0008227 A1    Jan. 10, 2019

(51) Int. Cl.
*A42B 3/04* (2006.01)
*F16B 2/22* (2006.01)
*A45F 5/02* (2006.01)

(52) U.S. Cl.
CPC ............. *A42B 3/0406* (2013.01); *A42B 3/04* (2013.01); *A45F 5/02* (2013.01); *F16B 2/22* (2013.01); *A45F 2200/0533* (2013.01)

(58) Field of Classification Search
CPC ........... A42B 3/0406; A42B 3/04; A42B 3/00; A42B 3/30; A42B 3/227; A42B 1/24; A45F 5/02; F16B 2/22
USPC ..................................... 2/422, 421, 6.2, 6.3
See application file for complete search history.

(56) References Cited

U.S. PATENT DOCUMENTS

| | | | |
|---|---|---|---|
| 5,419,020 A | 5/1995 | Murai | |
| 5,914,816 A * | 6/1999 | Soto | A42B 3/04 2/6.5 |
| 6,457,838 B1 | 10/2002 | Dugmore et al. | |
| 6,497,493 B1 * | 12/2002 | Theisen | A42B 3/044 2/422 |
| 6,811,348 B1 * | 11/2004 | Meyer | A42B 3/04 403/325 |
| 6,938,276 B1 * | 9/2005 | Prendergast | A42B 3/04 2/422 |
| 9,414,633 B2 * | 8/2016 | Giroux Bernier | A42B 1/24 |
| 9,631,899 B2 * | 4/2017 | Lebel | F41H 1/08 |
| 9,775,395 B2 * | 10/2017 | Teetzel | A42B 3/042 |

(Continued)

FOREIGN PATENT DOCUMENTS

GB    2 544 686 A    5/2017

OTHER PUBLICATIONS

International Search Report and Written Opinion dated Oct. 9, 2018 in connection with International Application No. PCT/IB2018/000794.

*Primary Examiner* — Corey N Skurdal
(74) *Attorney, Agent, or Firm* — Wolf, Greenfield & Sacks, P.C.

(57) ABSTRACT

Attachment systems for releasably securing an accessory to an article, such as a helmet, are disclosed. In one embodiment, an attachment system includes an attachment plate that includes engaging features which engage corresponding engagement features on an attachment base. At least one of the engaging features on the attachment plate is associated with a flexible member, and is movable between a locked configuration and an unlocked configuration via deformation of the flexible member. A pair of grips are provided on opposing ends of the flexible member, and the grips are pressed toward one another to move the movable engaging feature between the locked and unlocked configurations.

25 Claims, 8 Drawing Sheets

(56) References Cited

U.S. PATENT DOCUMENTS

| | | | |
|---|---|---|---|
| 2008/0184462 A1* | 8/2008 | Prendergast | A42B 3/04 2/410 |
| 2009/0038056 A1* | 2/2009 | Bobbin | A42B 3/04 2/422 |
| 2010/0175172 A1* | 7/2010 | Dempsey | A42B 3/042 2/422 |
| 2010/0299814 A1* | 12/2010 | Celona | A42B 3/04 2/422 |
| 2011/0072562 A1* | 3/2011 | Prendergast | A42B 3/04 2/422 |
| 2011/0145981 A1* | 6/2011 | Teetzel | A42B 3/04 2/422 |
| 2012/0090079 A1 | 4/2012 | Lebel et al. | |
| 2012/0204331 A1 | 8/2012 | Lebel et al. | |
| 2015/0282549 A1* | 10/2015 | Lebel | A42B 3/04 2/422 |
| 2015/0351482 A1* | 12/2015 | Gendron | A42B 3/04 2/422 |

* cited by examiner

ATTACHMENT SYSTEM

FIELD

Aspects of the present disclosure relate generally to attachment systems, and more particularly to attachment systems including an attachment plate releasably attachable to an attachment base.

DISCUSSION OF THE RELATED ART

Individuals at risk of exposure to trauma or injury (e.g., soldiers, emergency responders, law enforcement officers, military personnel, athletes, etc.) may wear protective gear, such as a helmet or a vest, to protect the wearer against injury. In some cases, an accessory may be attached to the protective gear. For example, a helmet may include a front mount which includes an accessory mounting region for attaching an accessory (e.g., a camera) to the front of the helmet.

SUMMARY

According to one aspect, an attachment system for mounting an accessory to a wearable article includes an attachment plate securable to an attachment base on the wearable article. A first engaging element is provided on the attachment plate, and the first engaging element is constructed and arranged to engage a second engaging element on the attachment base. The attachment plate includes a flexible member extending in a direction from a first side of the attachment plate toward a second side of the attachment plate opposite the first side, and a third engaging element coupled to the flexible member. The third engaging element is constructed and arranged to engage a fourth engaging element on the attachment base. The attachment base further includes first and second grips positioned on opposite sides of the flexible member, and the flexible member and the first and second grips configured such that movement of the grips toward one another deforms the flexible member. When the first engaging element is engaged with the second engaging element on the attachment base, the third engaging element is movable between an unlocked position in which the third engaging element is not engaged with the fourth engaging element on the attachment base, and a locked position in which the third engaging element is engaged with the fourth engaging element to secure the attachment body to the attachment base. The third engaging element is movable between the locked and unlocked positions via deformation of the flexible member.

According to another aspect, an adapter plate attachable to an attachment base includes a plate body constructed and arranged to be attached to an attachment base, and first and second engagement elements extending from the plate body. The first and second engagement elements are constructed and arranged to engage third and fourth engagement elements of the attachment base, and the plate body includes a connector to connect an accessory. The adapter plate further includes a flexible member extending in a direction from a first side of the plate body to a second side of the plate body opposite the first side, and the second engagement element is coupled to the flexible member and is movable relative to the first engagement element via deformation of the flexible member. First and second grips positioned on opposite sides of the flexible member, wherein the grips are constructed and arranged to be pressed toward one another to cause the flexible member to deform.

According to further aspect, a method of operating an attachment system includes engaging a first engaging element of an attachment plate with a first corresponding engaging element on an attachment base, and deforming a flexible member on the attachment plate to move a second engaging element of the attachment plate toward an unlocked configuration. The second engaging element associated with the flexible member. The method further includes releasing the deformation of the flexible member to move the second engaging element toward locked configuration in which the second engaging element of the attachment plate engages a second corresponding engaging element of the of the attachment base.

BRIEF DESCRIPTION OF DRAWINGS

Aspects of the invention are described below, by way of example, with reference to the accompanying drawings in which like numerals reference like elements, and wherein.

DETAILED DESCRIPTION

Figure 1:
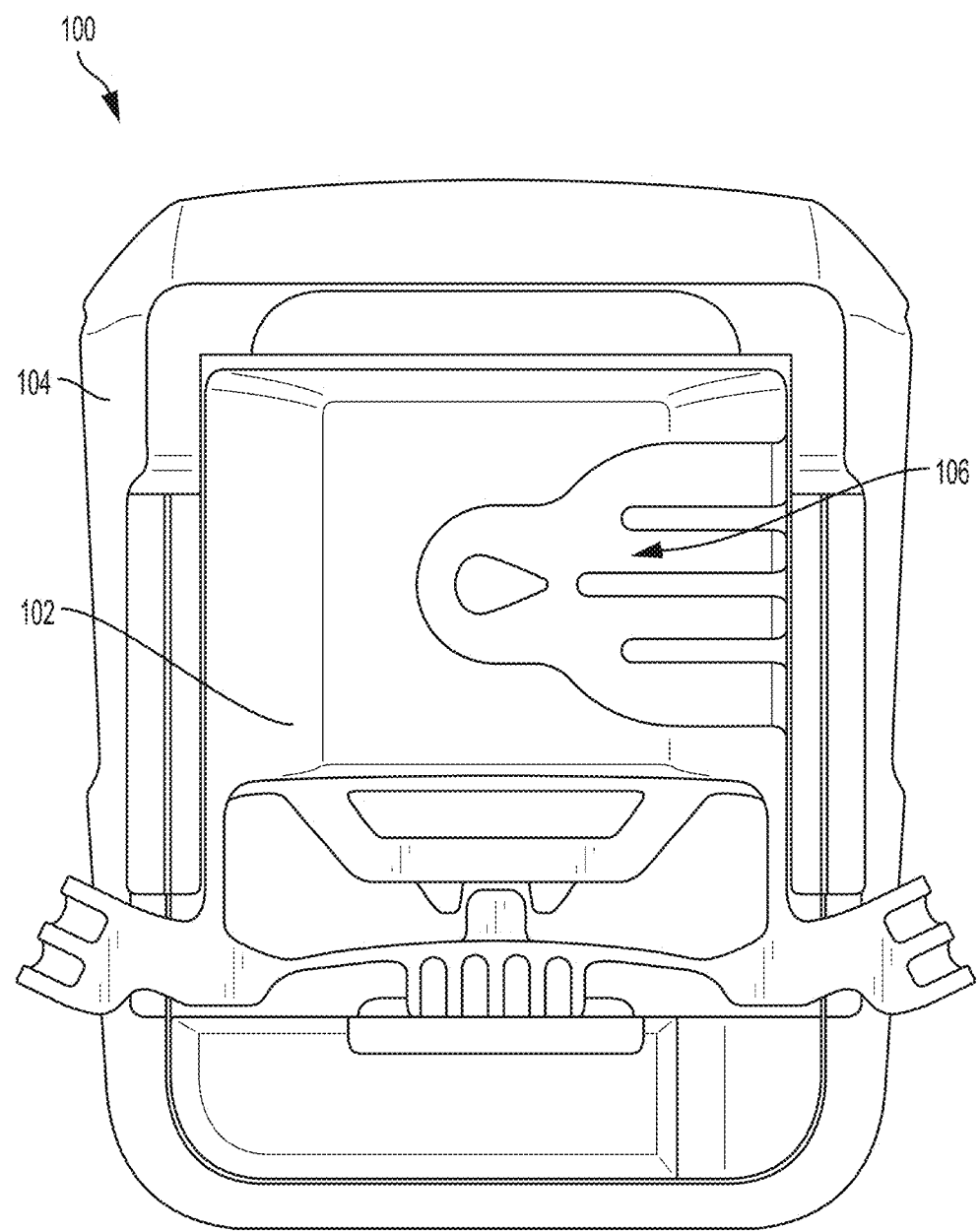
FIG. 1 is a front view of an attachment system including an adapter plate secured to an attachment base, according to one embodiment.

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Various embodiments are described in connection with an attachment system for mounting an adapter plate to an attachment base. The attachment base may define an accessory mounting region of a helmet or other wearable article, and the adapter plate may include a connector for attaching an accessory to the adapter plate to mount the accessory to the article. However, the present disclosure is not necessarily so limited, and the attachment base may be employed to directly mount an accessory without the use of a separate connector which attaches via an adapter plate. For ease of understanding, the attachment system is described in connection with an accessory mount which may be provided on a wearable article, such as on the front of a helmet.

The present disclosure relates to attachment systems which provide for simple attachment and removal of an adapter for mounting an accessory to a wearable article. Applicant has recognized that various wearable accessories, such as cameras, visors, night vision goggles, etc. may have different mounting arrangements. Accordingly, Applicant has appreciated that it may be desirable to provide an adapter plate to facilitate mounting of accessories that utilize a mounting arrangement that is different than that provided on the wearable article. Moreover, Applicant has recognized that prior art attachment systems may be difficult to manufacture, and may not provide for easy attachment to and/or removal from a mounting region on an article.

Embodiments disclosed herein provide attachment systems that may be easily attached and removed from an article, while allowing an accessory to be securely attached to the article. For example, an accessory may use a connector arrangement that differs from the mounting system present on an article such as a helmet. In such instances, according to the present disclosure, an adapter plate may be easily attached to the existing mounting system on the helmet (or other article), with the adapter plate having a suitable connector to receive the accessory. In this manner, the user can adapt the helmet attachment system to one or more different mounting system, expanding the range of accessories that can be attached.

In one embodiment, an attachment system may include an attachment plate that a user selectively secures to an attachment base by squeezing two grips toward each other to move an engagement element. For example, the attachment base may be a mounting arrangement formed on an article, such as a helmet or a vest, and the attachment plate may be secured to the attachment base. The attachment plate may have engaging elements that are engageable with corresponding engaging elements on the attachment base to secure the attachment plate to the attachment base. The attachment plate further includes a flexible member extending in a direction across the attachment plate, and the one or more of the engaging elements on the attachment plate may be coupled to the flexible member such that those engaging features are moveable via deformation of the flexible member. In some instances, the user deforms the flexible member by squeezing the grips mentioned above. In other instances, the flexible member may deform in response to the attachment plate being pressed or otherwise moved into contact with the attachment base.

In some embodiments, the engaging features on the attachment plate are tabs that extend from the attachment plate. The tabs may be arranged to engage with corresponding recesses formed on the attachment base. For example, in one embodiment, the attachment plate includes a first tab extending from the attachment plate, and a second tab extending from the flexible member. In this manner, the second tab may be moveable relative to the first tab via deformation of the flexible member. In other embodiments, the engaging features on the attachment plate may be recesses arranged to engage with corresponding tabs formed on the attachment base. In one such embodiment, the attachment plate may have a recess associated with the flexible member, and that recess may be moveable to selectively secure the attachment plate to the attachment base. Although embodiments are described herein including engaging features in the form of tabs and corresponding recesses, it should be understood that the current disclosure not so limited, and that the attachment systems may include any suitable engaging features.

According to some aspects, the attachment plate includes first and second engaging elements, and the second engaging element may be moveable relative to a first engaging element while the first engaging element is engaged with the attachment base. Such movement of the second engaging element may correspond to movement between a locked configuration, in which the second engaging element is engaged with the attachment base to secure the attachment plate to the attachment base, and an unlocked configuration in which the second engaging element is not engaged with the attachment base. First and second grips may be provided on opposing ends of the flexible member, and the grips may be pressed toward one another by a user to move the second engaging element from the locked configuration to the unlocked configuration. For example, pressing the grips toward one another may cause the flexible member to bend, thereby moving the second engaging element out of engagement with a corresponding engaging element on the attachment base. In some embodiments, the movement of the second engaging member may be along a direction that is transverse to a direction of movement of the grips as they are pressed toward one another.

In some embodiments, the flexible member may deform without a user pressing on the grips. For example, a camming arrangement such as one or more angled surfaces may be provided on the attachment plate and/or the attachment base, and the camming arrangement may be configured to cause deformation of the flexible member when the attachment plate is pressed into contact with the attachment base. In this manner, the attachment plate may be secured to the attachment base without requiring a user to press the grips toward one another to move the movable engaging element to the unlocked configuration. In one embodiment, a moveable engaging element associated with the flexible member includes an angled surface. When the angled surface is pressed against a portion of the attachment base (e.g., a surface of the attachment base adjacent an engaging element on the attachment base), a camming force acts on the movable engaging element and causes the flexible member to deform, thereby moving the movable engaging element toward the unlocked configuration to allow the movable engaging element to engage with a corresponding engaging element on the attachment base. In other embodiments, an angled surface (or other suitable camming features) may be provided on the attachment base, or on both the attachment plate and attachment base. Accordingly, it should be understood that the current disclosure is not limited to any particular arrangement of camming features to cause deformation of the flexible member.

According to some aspects, deformation of the flexible member may result in a bias force which urges the second engaging element from the unlocked configuration toward the locked configuration. As a result, when the grips are pressed together to deform the flexible member, releasing the grips may cause the second engaging element to move from the unlocked configuration toward the locked configuration due to the bias force. Similarly, the bias force may be employed in embodiments including a camming arrangement to move a movable engaging element toward the unlocked configuration upon pressing the attachment plate into contact with the attachment base. For example, the bias force may cause the moveable engaging element to automatically move toward the locked configuration after being moved toward the unlocked configuration via the camming arrangement. In this manner, the attachment plate may be secured to the attachment base without requiring a user to press on the grips. For instance, the camming arrangement and bias force may result in a snap fit such that the moveable engaging element on the attachment plate may snap into engagement with an associated engaging element on the attachment base when the attachment plate is pressed into contact with the attachment base.

In one aspect, the attachment plate may include one or more guide features arranged to guide movement of the second tab when the grips are pressed toward one another. For instance, the guide features may be arranged to guide the movement of the second engaging element when the grips are pressed toward one another with different forces applied to each grip. Applicant has recognized that such unequal application of force to the grips and/or asymmetric deformation of the flexible member may result in undesirable lateral movement of the second engaging element relative to the corresponding engaging element on the attachment base, which may lead to incomplete movement between the locked and unlocked configurations. In one embodiment, the attachment plate includes a guide channel arranged to receive a boss associated with the second engaging element and extending from the flexible member. In the event that unequal forces are applied to the grips, the boss may contact the guide channel, thereby limiting lateral movement of the second engaging element. In some embodiments, the boss and/or guide channel may have corresponding angled surfaces, which may further assist with guiding the movement of the second engaging element. For example, the angled surfaces may act as camming surfaces that apply a force on the boss to guide the boss toward the center of the guide channel as the boss is received in the guide channel.

In one illustrative embodiment, the attachment plate may be an adapter plate including an adapter configured for attaching a camera to the adapter plate, thereby allowing the camera to be mounted to an article, such as a helmet or a protective vest.

FIG. 1 shows an attachment system 100 including an adapter plate 102 secured to an attachment base 104. The attachment base may be formed on or attached to an article, such as a helmet (see FIGS. 8-9). For instance, the attachment base may be part of a front mount of a helmet. The adapter plate includes an adapter area having a connector 106 to attach an accessory to the adapter plate.

Figure 2:
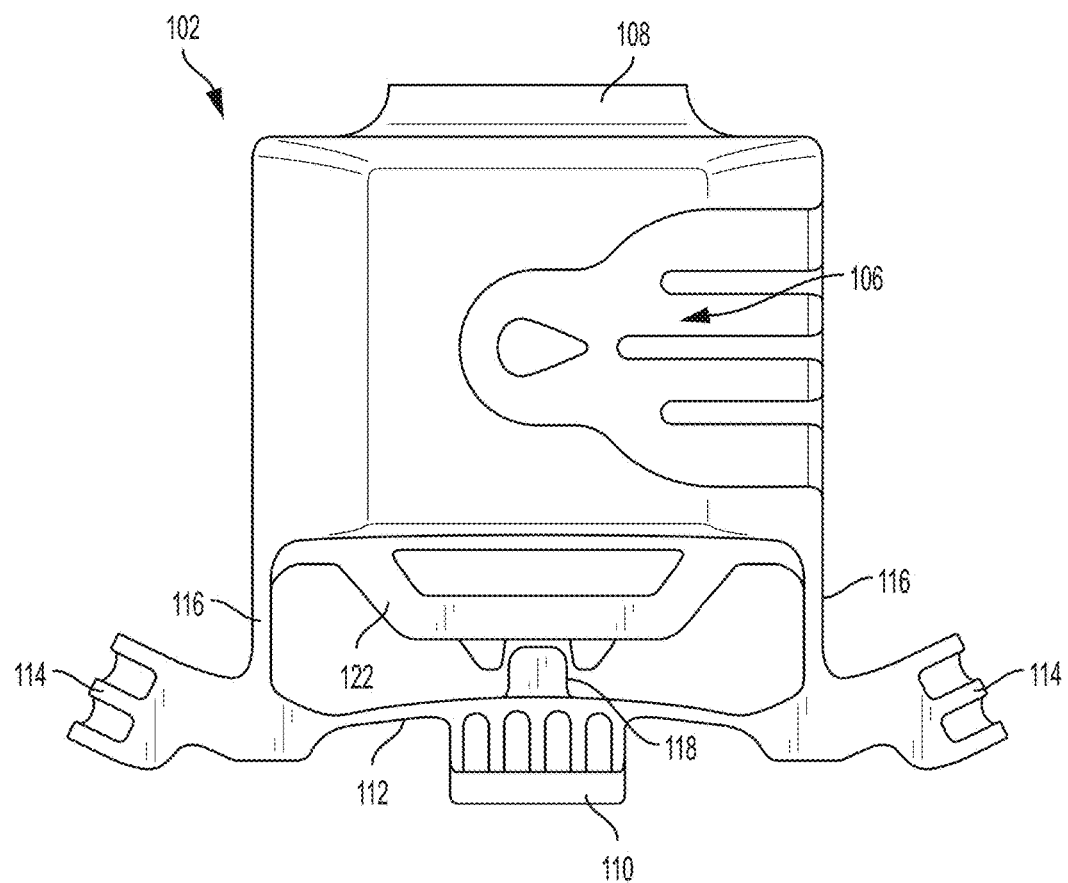
FIG. 2 is a front view of the adapter plate of FIG. 1.
Figure 3:
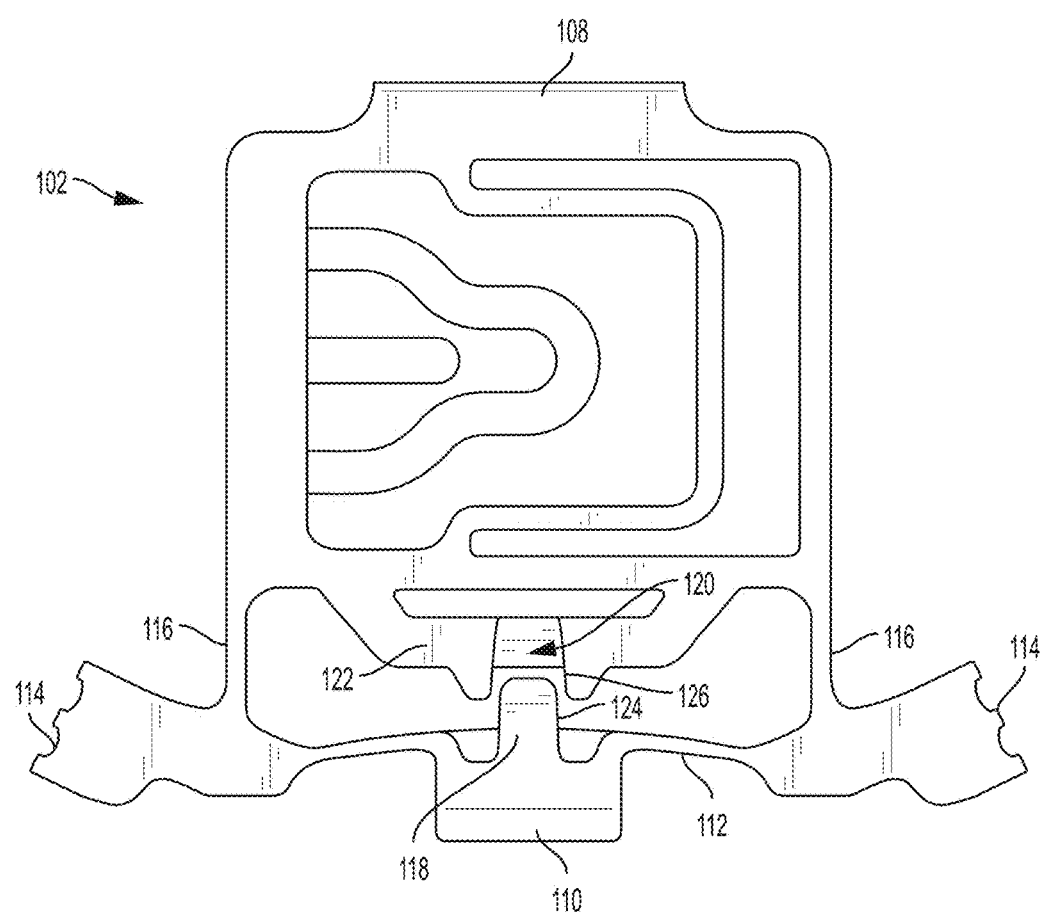
FIG. 3 is a rear view of the adapter plate of FIG. 1.

Referring to FIGS. 2-3, the adapter plate 102 of FIG. 1 is described in more detail. The adapter plate includes first and second engaging elements in the form of a first tab 108 and a second tab 110 extending from the adapter plate. The first and second tabs are arranged to engage corresponding recesses (not shown in FIGS. 2-3) formed on the attachment base 104 to secure the adapter plate to the attachment base. In the depicted embodiment, the first tab 108 is a fixed tab, and the second tab 110 is a movable tab, which is provided on a flexible member 112. The flexible member extends from a first side of the adapter plate to a second side of the adapter plate between a pair of struts 116. The second tab 110 is movable relative to the first tab 108 via deformation of the flexile member 112.

A pair of grips 114 are provided on opposite ends of the flexible member 112. In the depicted embodiment, the grips are positioned at the ends of the struts 116. As described in more detail below, the grips may be pressed toward one another to cause deformation (e.g., bending deformation) of the flexible member 112, thereby moving the second tab 110 between a locked configuration and an unlocked configuration. However, it should be understood that in some cases, the flexible member 112 may be deformable without pressing the grips, as the disclosure is not limited in this regard.

In some embodiments, the struts 116 may bend or otherwise deform to allow the grips to be pressed toward one another. However, it should be understood that the disclosure is not limited to grips that are moveable via deformable struts. For example, in some embodiments, the struts and/or the grips may be attached to the attachment plate via a suitable pivotal structure that allows the grips to be moved toward one another to cause deformation of the flexible member 112. Moreover, it should be understood that the current disclosure is not limited to any particular structure for the grips 114. For example, in the depicted embodiments, the grips include a grooved surface structure, which may aid in a user gripping the grips. In other embodiments, the grips may simply be planar or curved surfaces, or the grips may include textured or tacky surface features to improve grip. The grips are not required to include a surface treatment that provides a gripping friction beyond the friction of the material used. Nor are the grips necessarily required to have a specific shape or structure to help maintain contact with the users fingers. For example, embodiments may include grips made of smooth, planar plastic.

Figure 4:
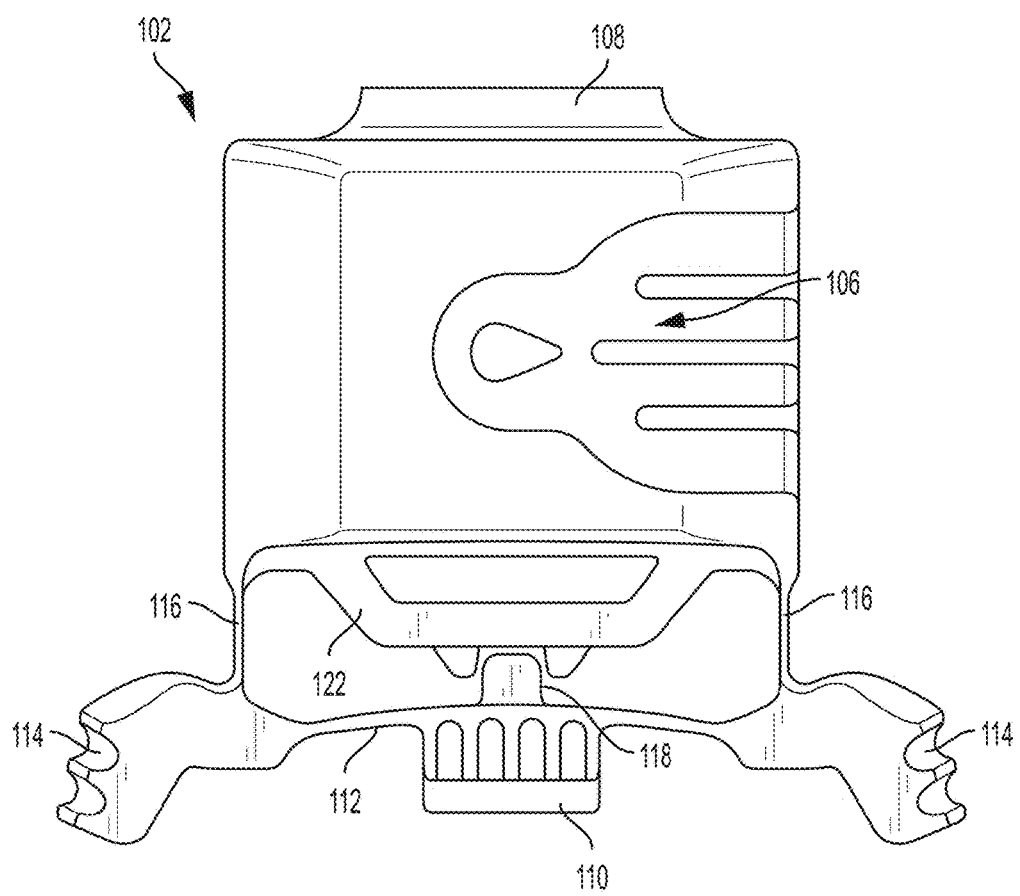
FIG. 4 is a front view of an adapter plate, according to one embodiment.
Figure 5:
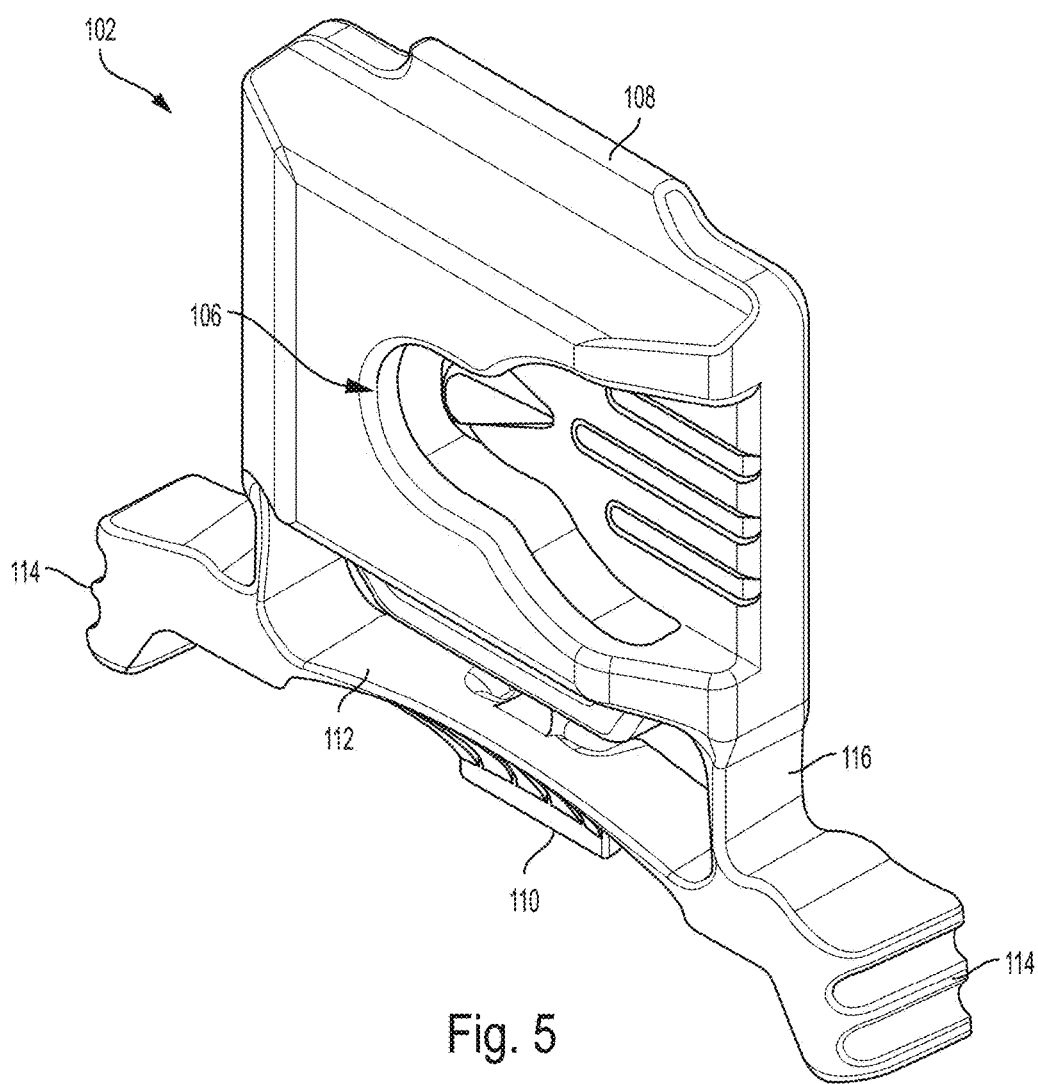
FIG. 5 is a front perspective view of the adapter plate of FIG. 4.

While the grips 114 are shown at ends of the flexible member 112, the grips may be positioned inwardly of the ends of the flexible member in some embodiments. In this manner, the grips may be positioned on opposite sides of the flexible member, but not at the ends of the flexible member. Moreover, while the grips extend upwardly at an angle relative to the flexible member in the embodiment show in FIGS. 2-3, other configurations for the grips are also suitable. For example, FIGS. 4-6 depict an embodiment of an adapter plate 102 in which the grips include shoulders, and do not extend upwardly away from the flexible member 112.

Connector 106 may include any suitable connection arrangement. In the illustrated embodiment, a flexible backing plate is provided, along with a protrusion such that an complementary connector on an accessory may be slid into connector 106 and secured to the adapter plate 102.

FIGS. 2-6 show an adapter plate 102 in a configuration in which the grips are not pressed toward one another, which may correspond to a locked configuration in which the second tab 110 is engaged with a corresponding recess on the attachment base 104 to secure the adapter plate to the attachment base. In the depicted embodiment, the flexible member 112 is formed as a living hinge with a curved configuration, and is arranged to cause movement of the second tab 110 toward the first tab 108 upon pressing the grips toward one another. However, it should be understood that in other embodiments, the flexible member may be arranged to cause displacement of the second tab away from the first tab upon pressing the grips toward one another, as the disclosure is not limited in this regard.

Figure 6:
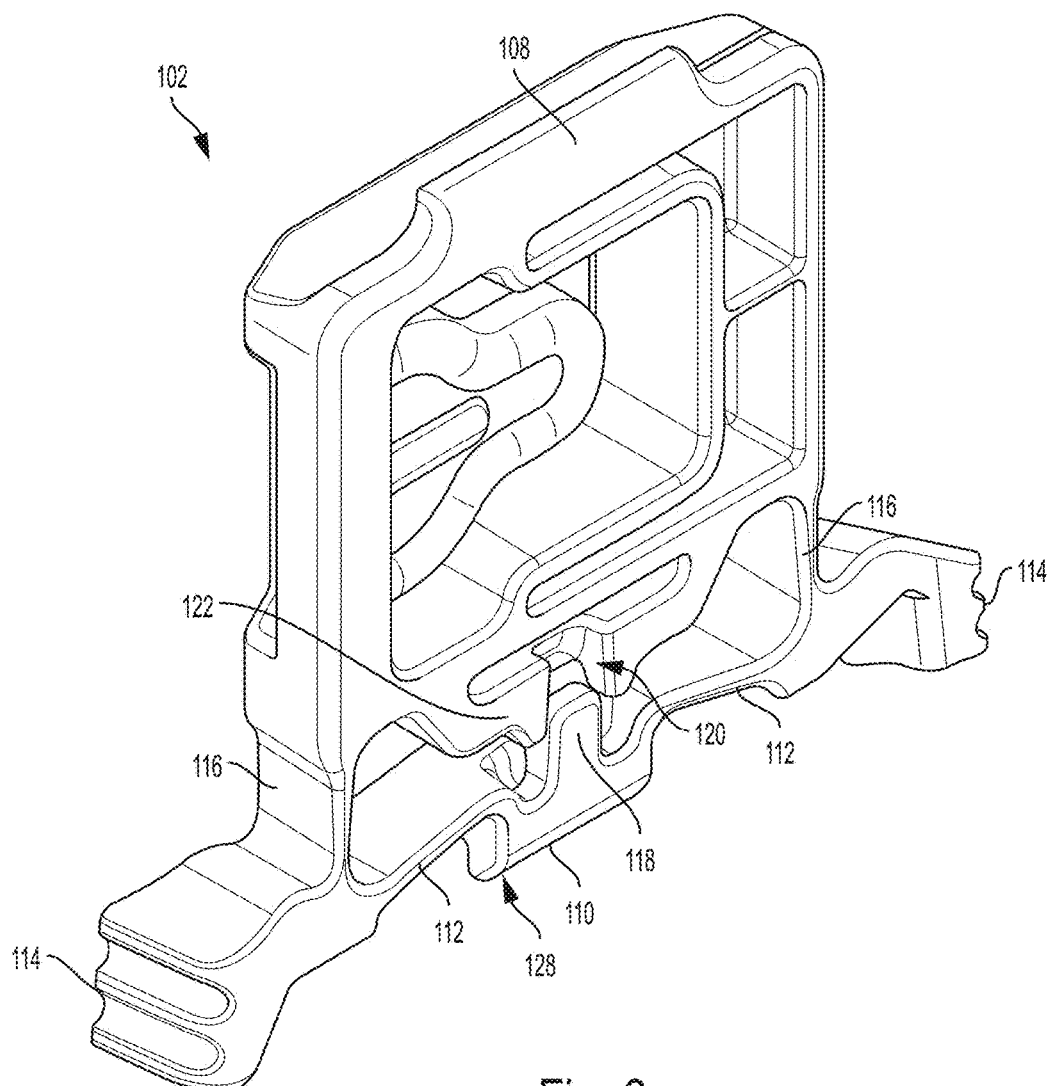
FIG. 6 is a rear perspective view of the adapter plate of FIG. 4.

As best illustrated in FIGS. 3 and 6, the adapter plate 102 includes a guide channel 120 arranged to receive a boss 118 associated with the flexible member and the second tab 110. When the grips 114 are pressed toward each other to move the second tab to the unlocked configuration, the boss 118 is received in the guide channel to limit and/or prevent lateral movement of the second tab 110, which may occur due to unequal application of force to the grips 114. As illustrated, the boss 118 and guide channel 120 may have corresponding angled sidewalls 124 and 126, which may assist in guiding the boss toward the center of the guide channel, thereby further limiting or preventing lateral movement of the second tab 110. In the depicted embodiment, the guide channel is formed partially through an arm 122 extending from the adapter plate 102 adjacent the connector 106.

Figure 7:
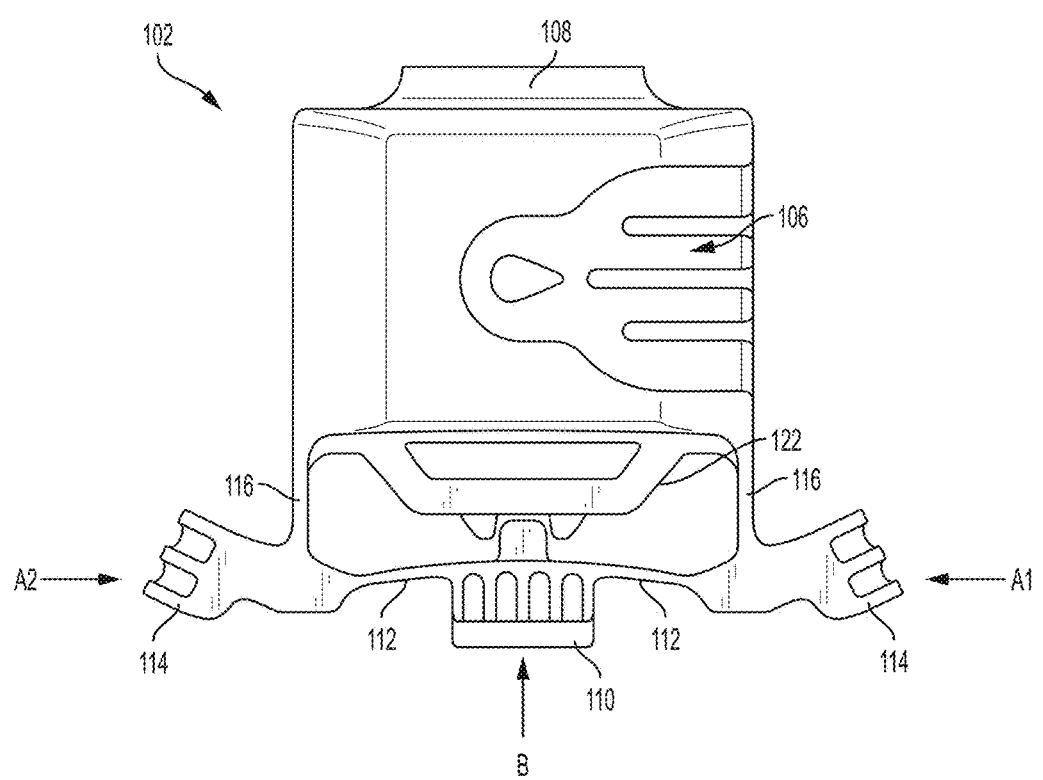
FIG. 7 illustrates a method of using an adapter plate, according to one embodiment.

Referring now to FIG. 7, the operation of the attachment system 100 is described in more detail. To attach the adapter plate 102 to the attachment base 104, the first tab 108 is inserted into an opening on the attachment base. In some cases, a user may insert the first tab while holding the adapter plate at an angle with respect to attachment base, i.e., with the second tab elevated above the attachment base while the first tab is engaged with the attachment base. Subsequently, a user may rotate the adapter plate downwardly such that the second tab 110 is in position to engage with the attachment base.

To secure the second tab to a corresponding opening (not depicted) on the attachment base 104, a user may press the grips 116 toward each other in directions A1 and A2. Due to the curved arrangement of the flexible member 112, the force applied to the grips causes the second tab 110 to move upwardly in direction B, thereby moving the second tab to the unlocked configuration. As can be seen in FIG. 7, direction B may be transverse to directions A1 and A2. In some embodiments, the direction of movement of second tab 110 is substantially perpendicular or perpendicular to the initial motion of one or both grips. In some embodiments the direction of movement of second tab 110 is at least one of transverse, substantially perpendicular, or perpendicular to the direction of force applied to one or both grips.

When in the unlocked configuration, the adapter plate may be rotated downwardly to be fully received by the attachment base 104, and subsequently, the user may release the tabs 116 to allow the second tab to move into the locked configuration, in which the second tab is engaged with a corresponding recess on the attachment base. As discussed previously, the curved configuration of the flexible member 112 may provide a bias force that urges the second tab toward the locked configuration when the grips 116 are released. When the first and second tabs are engaged with the attachment base, the adapter plate is secured to the attachment base, and a user may subsequently attach an accessory to the attachment system via connector 106.

As noted previously, in some embodiments, the adapter plate 102 may be attachable to the attachment base 104 without pressing the grips together. For instance, the adapter plate and/or attachment base may include a camming arrangement, such as angled surface 128 on the second tab 110 (FIG. 6), configured to cause deformation of the flexible member 112 upon pressing the adapter plate into contact with the attachment base. In one such embodiment, a user may secure the second tab 110 to a corresponding opening (not depicted) on the attachment base 104 by pressing the adapter plate against the attachment base after engaging the first tab 108 with the attachment base. In particular, the camming arrangement may result in the application of a camming force to the second tab 108, thereby causing the flexible member 112 to deform and allow the second tab to move toward the unlocked configuration. Similar to the embodiment described above, once in the unlocked configuration, the adapter plate 102 may be fully received by the attachment base 104. In some embodiments, a bias force from the flexible member 112 may cause the second tab to automatically move toward the locked configuration when the adapter plate is received in the attachment base. In this manner, the second tab may snap into engagement with the attachment base.

In still other embodiments, the adapter plate 102 may be attachable to the attachment base 104 without deformation of the flexible member 112. For example, the second tab 110 may be inserted into the attachment base first, without deformation of the flexible member, or even without movement of the second tab relative to the adapter plate 102. The first tab 108, which may be movable relative to plate, then is inserted into adapter plate. For example, the first tab 108 may be a spring-loaded tab that can be retracted prior to or during insertion. To remove the adapter plate 102, the grips may be operated as with other embodiments disclosed herein.

To remove the adapter plate 102 from the attachment base, a user may press the grips 116 toward one another to move the second tab 110 from the locked configuration to the unlocked configuration, such that the second tab is no longer engaged with the attachment base 102. The user may then rotate the adapter plate upwardly, and subsequently disengage the first tab 108 from the attachment base.

For purposes herein, for an engagement element such as a tab to be considered to be in an unlocked configuration or position does not necessarily require that the engagement element have previously been in a locked configuration or position. An unlocked position can be a position in which the engagement element is being prepared to be moved into a locked position.

In some embodiments, the attachment plate lock and unlock arrangement may be used with components that are not configured to be attached to a wearable article. Additionally, in some embodiments, the grip and flexible member arrangements disclosed herein may be used with components other than adapter plates and components having connectors.

Figure 8:
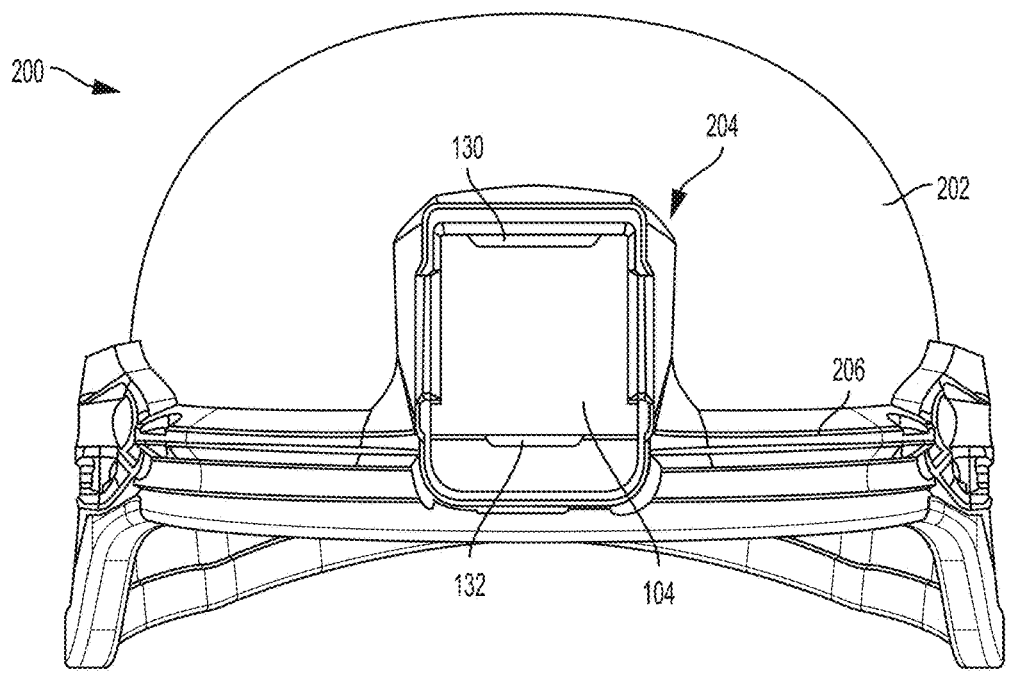
FIG. 8 is a front view of a helmet including a front mount with an attachment base according to one embodiment.
Figure 9:
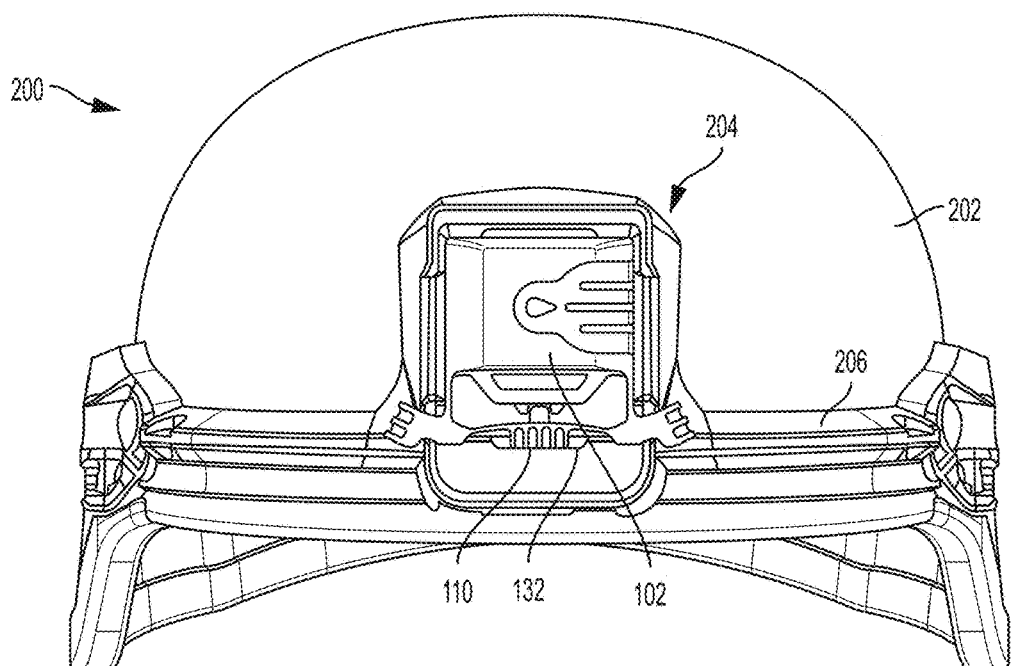
FIG. 9 shows the embodiment of FIG. 8 with an adapter plate attached.

FIGS. 8-9 show a helmet system 200 including a helmet 202 with a front mount 204. The front mount shown in the illustrated embodiment includes lateral arms 206, but any suitable front mount may be used. Attachment base 104 is formed as part of front mount 204, and includes engagement elements in the form of recesses 130, 132 to receive tabs 108, 110 of adapter plate 102. In some embodiments, attachment base 104 is not formed as part of a front mount. Instead of an adapter plate, the flexible member and grip arrangements disclosed herein may be attached (for example, permanently) to an accessory such that the accessory is mountable to attachment base 104 with the flexible member arrangement without connector 106.

It should be understood that the current disclosure is not limited to any particular dimensions for the various components of the attachment system. In some embodiments, the adapter plate may have a length between approximately 25 and 75 mm, and a width between approximately 30 and 100 mm. In one embodiment, the adapter plate length is about 52 mm and the adapter plate width is about 67 mm.

Depending on the particular embodiment, the components of the attachment system may be made from any suitable materials. In one embodiment, the adapter plate may be formed as a unitary body, and may be formed via a suitable molding process, such as an injection molding process. In such embodiments, the adapter plate may be made from a plastic material, e.g., a nylon material or other suitable polymeric material. In one exemplary embodiment, the adapter plate is formed from ST801 nylon resin.

In certain embodiments, the adapter plate may be made not from a single material, but instead include components made from different materials. For example, the first and/or second tabs (or other suitable engaging features) may be made from a suitable metal, metal alloy, or composite material, while the other components may be made from a plastic material. In one such embodiment, the first and/or second tabs may be overmolded with the adapter plate. In view of the above, it should be understood that the current disclosure is not limited to any particular materials and/or methods for manufacturing the components of an attachment system.

Although embodiments utilizing a unitary construction for the adapter plate are described above, it should be understood that other configurations also may be suitable. For instance, although a flexible member in the form of a curved living hinge structure is described above, other linkage or hinge configurations are also contemplated.

For purposes of this patent application and any patent issuing thereon, the indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

The foregoing description of various embodiments are intended merely to be illustrative thereof and that other embodiments, modifications, and equivalents are within the scope of the invention recited in the claims appended hereto.

What is claimed is:

1. An attachment system for mounting an accessory to a wearable article, the attachment system comprising:
    an attachment plate securable to an attachment base on a wearable article;
    a first engaging element on the attachment plate, the first engaging element constructed and arranged to engage a second engaging element on the attachment base;
    a flexible member extending in a direction from a first side of the attachment plate toward a second side of the attachment plate opposite the first side; and
    a third engaging element coupled to the flexible member, the third engaging element constructed and arranged to engage a fourth engaging element on the attachment base;
    first and second grips positioned on opposite sides of the flexible member, the flexible member and the first and second grips configured such that movement of the grips toward one another deforms the flexible member, wherein:
        when the first engaging element is engaged with the second engaging element on the attachment base, the third engaging element is movable between an unlocked position in which the third engaging element is not engaged with the fourth engaging element on the attachment base, and a locked position in which the third engaging element is engaged with the fourth engaging element to secure the attachment body to the attachment base, and
        the third engaging element is movable between the locked and unlocked positions via deformation of the flexible member.

2. The attachment system of claim 1, further comprising the attachment base.

3. The attachment system of claim 2, wherein the wearable article comprises a helmet and further comprising the helmet.

4. The attachment system of claim 1, wherein the first and third engaging elements are tabs extending from the attachment plate, and the second and fourth engaging elements on the attachment base are recesses constructed and arranged to receive the tabs.

5. The attachment system of claim 1, wherein the first and third engaging elements are recesses formed in the attachment plate, and the second and fourth engaging elements on the attachment base are tabs constructed and arranged to be received by the recesses.

6. The attachment system of claim 1, wherein the third engaging element moves in a direction transverse to the movement of the pressed grips.

7. The attachment system of claim 1, wherein the first and second grips are attached to the attachment plate via first and second flexible struts, respectively, and wherein pressing the first and second grips toward one another bends the first and second struts.

8. The attachment system of claim 1, wherein, when the third engagement element is in the unlocked configuration, the flexible member biases the third engagement element toward the locked configuration.

9. The attachment system of claim 1, further comprising a guide channel on the attachment plate arranged to receive a boss extending from the flexible member, wherein the guide channel is spaced from the flexible member when the third engaging feature is in the locked configuration.

10. The attachment system of claim 9, wherein the boss is received in the guide channel when the third engaging element is moved from the locked configuration toward the unlocked configuration.

11. The attachment system of claim 10, wherein the guide channel includes opposing angled surfaces arranged to guide the boss toward a center of the guide channel.

12. The attachment system of claim 1, further comprising an connector formed on the attachment plate constructed and arranged to releasably mount an accessory to the attachment plate.

13. The attachment system of claim 1, wherein the flexible member is a living hinge.

14. The attachment system of claim 1, further comprising a camming arrangement associated with at least one of the third and fourth engaging elements and constructed and arranged to cause deformation of the flexible member upon pressing the third engaging element into contact with the attachment base, wherein the camming arrangement comprises one or more angled surfaces on at least one of the third and fourth engaging elements.

15. An adapter plate attachable to an attachment base, the adaptor plate comprising:
    a plate body constructed and arranged to be attached to an attachment base;
    first and second engagement elements extending from the plate body, the first and second engagement elements constructed and arranged to engage third and fourth engagement elements of the attachment base;
    the plate body having a connector to connect an accessory;
    a flexible member extending in a direction from a first side of the plate body to a second side of the plate body opposite the first side, wherein the second engagement element is coupled to the flexible member and is movable relative to the first engagement element via deformation of the flexible member; and
    first and second grips positioned on opposite sides of the flexible member, wherein the grips are constructed and arranged to be pressed toward one another to cause the flexible member to deform.

16. The adapter plate of claim 15, wherein the second engagement element is moveable along a direction transverse to movement of the pressed grips.

17. The adapter plate of claim 15, further comprising a guide channel on the plate body arranged to receive a boss extending from the flexible member.

18. The adapter plate of claim 17, wherein the guide channel is spaced from the flexible member when the grips are not pressed toward one another, and wherein the boss is received in the guide channel when the second engagement element is moved toward the first tab.

19. The adapter plate of claim 15, wherein the first engagement element comprises a first tab, and the second engagement element comprises a second tab.

20. The adapter plate of claim 15, further comprising a camming arrangement on the second engagement element, the camming arrangement constructed and arranged to cause deformation of the flexible member upon pressing the second engaging element into contact with the attachment base.

21. A method of operating an attachment system, the method comprising:

engaging a first engaging element of an attachment plate with a first corresponding engaging element on an attachment base;

deforming a flexible member on the attachment plate to move a second engaging element of the attachment plate toward an unlocked configuration, the second engaging element associated with the flexible member; and releasing the deformation of the flexible member to move the second engaging element toward locked configuration in which the second engaging element of the attachment plate engages a second corresponding engaging element of the of the attachment base.

22. The method of claim 21, wherein deforming the flexible member comprises pressing first and second grips toward each other, the grips positioned on opposing ends of the flexible member.

23. The method of claim 21, further comprising applying a camming force to the second engaging element via a camming arrangement to cause the deformation of the flexible member.

24. The method of claim 21, wherein the deformation of the flexible member moves the second engaging element of the attachment plate along a direction transverse to a direction of movement of the pressed grips.

25. The method of claim 21, further comprising attaching an accessory to a connector on the attachment plate.

* * * * *